(12) United States Patent
Kosaka

(10) Patent No.: US 7,272,926 B2
(45) Date of Patent: Sep. 25, 2007

(54) EXHAUST EMISSION CONTROL DEVICE FOR INTERNAL COMBUSTION ENGINE

(75) Inventor: Yuji Kosaka, Obu (JP)

(73) Assignee: Denso Corporation, Kariya (JP)

( * ) Notice: Subject to any disclaimer, the term of this patent is extended or adjusted under 35 U.S.C. 154(b) by 10 days.

(21) Appl. No.: 11/142,291

(22) Filed: Jun. 2, 2005

(65) Prior Publication Data

US 2005/0268597 A1 Dec. 8, 2005

(30) Foreign Application Priority Data

Jun. 3, 2004 (JP) .............................. 2004-165694

(51) Int. Cl.
*F01N 3/00* (2006.01)
*F01N 3/02* (2006.01)

(52) U.S. Cl. ............................. 60/295; 60/277; 60/297; 60/311

(58) Field of Classification Search .................. 60/277, 60/297, 311, 295
See application file for complete search history.

(56) References Cited

U.S. PATENT DOCUMENTS

| 4,492,079 | A | * | 1/1985 | Takagi et al. .................. 60/274 |
| 4,603,550 | A | * | 8/1986 | Shinzawa ...................... 60/274 |
| 5,195,316 | A | * | 3/1993 | Shinzawa et al. .............. 60/274 |
| 5,287,698 | A | * | 2/1994 | Shinzawa et al. .............. 60/286 |
| 5,319,930 | A | * | 6/1994 | Shinzawa et al. .............. 60/286 |
| 5,511,413 | A | * | 4/1996 | Pfister et al. ............... 73/118.1 |
| 6,758,039 | B2 | * | 7/2004 | Kuboshima et al. ........... 60/311 |
| 6,941,750 | B2 | * | 9/2005 | Boretto et al. ................ 60/297 |
| 6,945,037 | B2 | * | 9/2005 | Plote et al. .................... 60/311 |
| 7,065,960 | B2 | * | 6/2006 | Gioannini et al. ............ 60/295 |
| 2003/0154710 | A1 | | 8/2003 | Plote et al. |

FOREIGN PATENT DOCUMENTS

| EP | 1180210 A | 2/2002 |
| JP | H07-317529 | 5/1994 |
| WO | WO 01/27447 A | 4/2001 |
| WO | WO 2004/016916 A | 2/2004 |

OTHER PUBLICATIONS

Patent Abstracts of Japan, vol. 1996, No. 04, Apr. 30, 1996, & JP 07 317529 A, Dec. 5, 1995.

* cited by examiner

*Primary Examiner*—Thomas Denion
*Assistant Examiner*—Loren Edwards
(74) *Attorney, Agent, or Firm*—Nixon & Vanderhye P.C.

(57) ABSTRACT

A DPF is used in an internal combustion engine for trapping PM discharged from an engine body. Presence and absence of an abnormality in the DPF is evaluated using differential pressure, which is between the front and the rear of the DPF. The differential pressure considerably decreases or considerably increases due to breakage or plugging of the DPF in an exhaust emission control device. The abnormality in the DPF is evaluated when a large deviation arises between a PM amount calculated in accordance with differential pressure, which is between the front and the rear of the DPF, and a PM amount calculated through integration of a PM discharge amount measured in accordance with an engine operating state. Thereby, presence and absence of the abnormality such as plugging and breakage in the DPF can be correctly detected.

7 Claims, 5 Drawing Sheets

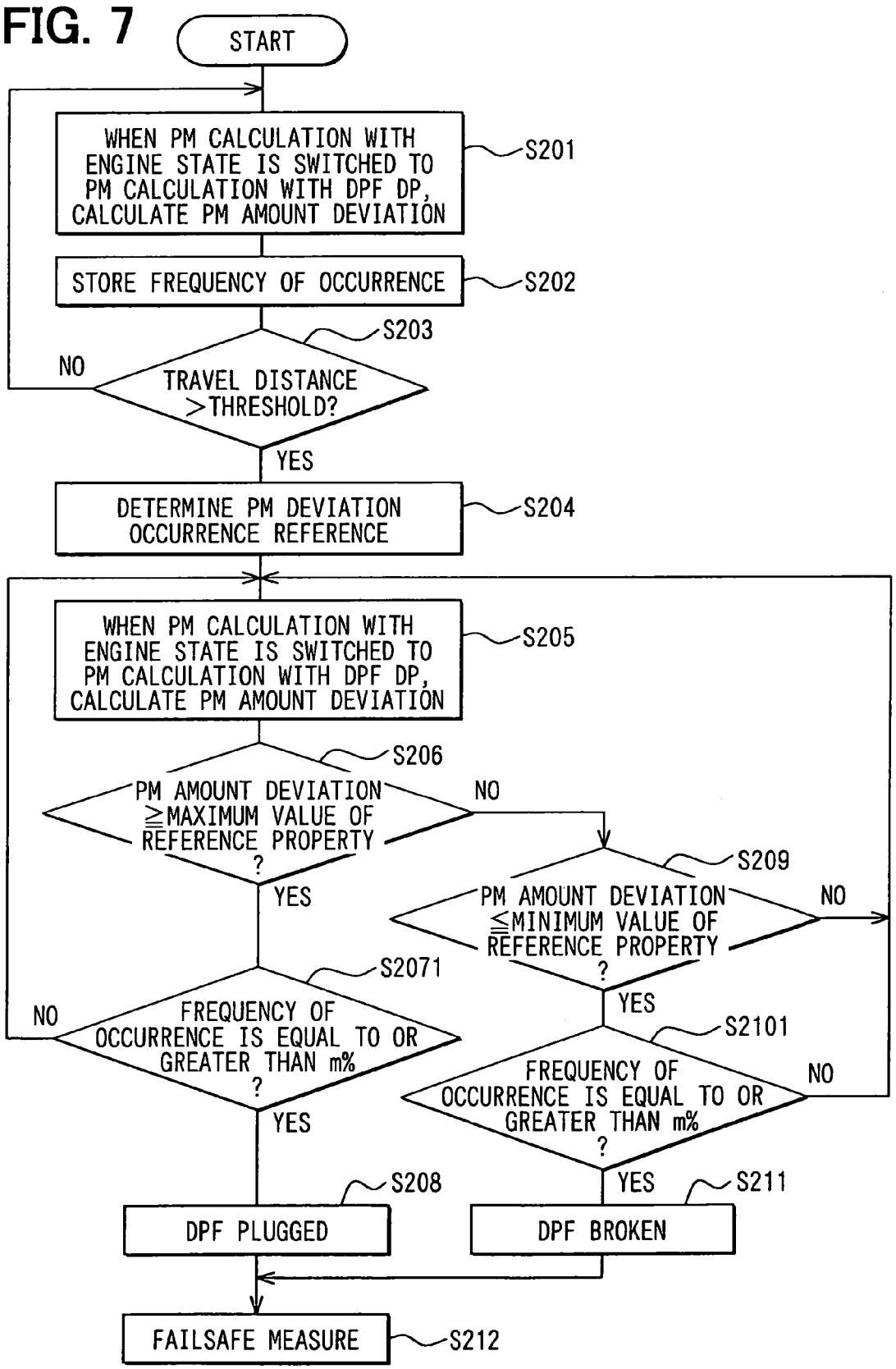

EXHAUST EMISSION CONTROL DEVICE FOR INTERNAL COMBUSTION ENGINE

CROSS REFERENCE TO RELATED APPLICATIONS

This application is based on and incorporates herein by reference Japanese Patent Application No. 2004-165694 filed on Jun. 3, 2004.

FIELD OF THE INVENTION

The present invention relates to an exhaust emission control device for an internal combustion engine, to which a particulate filter is provided. More particularly, the present invention relates to regeneration of a particulate filter.

BACKGROUND OF THE INVENTION

A diesel type internal combustion engine involves a problem in exhaust particulates (particulate matters, PM) contained in exhaust gas discharged from an internal combustion engine body. Accordingly, a diesel particulate filter (DPF) is used to trap PM. PM are trapped and accumulated in the DPF, and the PM are periodically burned and removed, so that the DPF is regenerated and the PM trapping capacity of the DPF is restored. Regeneration of the DPF can be made in operation of the internal combustion engine. For instance, the oxidation action of the oxidation catalyst such as platinum is used. The oxidation catalyst is increased in temperature by post injection or retard in ignition timing, so that regeneration of a DPF is started.

Delay in timing of regeneration of the DPF causes fast burn, and advance in the timing of regeneration of the DPF may increase fuel consumption. Accordingly, necessity of regeneration of the DPF is evaluated in accordance with a PM sediment amount (PM amount), which is measured. As the PM amount increases, differential pressure between the front of the DPF and the rear of the DPF increases. Therefore, the PM amount may be calculated in accordance with the differential pressure of the DPF. However, the calculation of the PM amount, which is based on the differential pressure of the DPF, is not necessarily satisfactory in accuracy of measurement in an unsteady operating state. The unsteady operating state includes a state, in which exhaust gas flows through the DPF at a small flow rate, and a transient state. According to JP-A-7-317529 and U.S. Pat. No. 6,758,039 (JP-A-2004-019529), the PM discharge amount is calculated in accordance with an operating state of the internal combustion engine, so that the PM discharge amount is integrated for calculating the PM amount.

Here, when abnormality is caused in flow of exhaust gas due to plugging or breakage in the DPF, the differential pressure of the DPF changes from that in a normal condition, in which exhaust gas normally flows. The abnormality in the DPF can be detected in accordance with the differential pressure. Specifically, when the differential pressure of the DPF is less than a predetermined value, exhaust gas is determined to be leaking due to breakage of the DPF.

When the PM amount is large, abnormality in the DPF can be satisfactory detected, since the differential pressure of the DPF sufficiently changes at the time of breakage. However, when the PM amount is small as immediately after completion of regeneration of the DPF, the differential pressure does not sufficiently change. Accordingly, presence and absence of the abnormality in the DPF may not be correctly detected.

SUMMARY OF THE INVENTION

In view of the foregoing problems, it is an object of the present invention to provide an exhaust emission control device for an internal combustion engine, the exhaust emission control device being capable of detecting states of breakage and plugging of a DPF with high accuracy.

According to the present invention, an exhaust emission control device for an internal combustion engine includes a particulate filter and a sediment amount calculation means. The particulate filter traps exhaust particulates contained in exhaust gas discharged from an internal combustion engine body. The sediment amount calculation means calculates a sediment amount of exhaust particulates, which are trapped and accumulated by the particulate filter, for evaluating necessity of regeneration of the particulate filter in accordance with the sediment amount. The sediment amount calculation means includes a first sediment calculation means and a second sediment amount calculation means. The first sediment calculation means calculates a first sediment amount in accordance with differential pressure between the front side of the particulate filter and the rear side of the particulate filter. The second sediment amount calculation means calculates an amount of exhaust particulates discharged from the internal combustion engine body per unit of time, in accordance with an operating state of the internal combustion engine body. The second sediment amount calculation means integrates the amount of exhaust particulates to calculate a second sediment amount. The exhaust emission control device further includes an abnormality evaluating means. The abnormality evaluating means evaluates presence and absence of an abnormality in flow of exhaust gas, which flows through the particulate filter, in accordance with a correspondence between the first sediment amount and the second sediment amount.

The exhaust emission control device further includes a selection means. The selection means selects from the first sediment calculation means and the second sediment calculation means in accordance with the operating state of the internal combustion engine body for evaluating necessity of regeneration of the particulate filter. The second sediment amount calculation means calculates the second sediment amount by integrating the amount of exhaust particulates, which are discharged from the internal combustion engine body, with the first sediment amount, which is calculated immediately before the sediment amount calculation means is switched from the first sediment calculation means. The abnormality evaluating means expresses the correspondence between the first sediment amount and the second sediment amount using a difference between the sediment amount calculated immediately before switchover, which is from the second sediment amount calculation means to the first sediment calculation means, and the sediment amount calculated immediately after the switchover from the second sediment amount calculation means to the first sediment calculation means. When the difference between the first sediment amount and the second sediment amount is out of a predetermined reference range, the abnormality evaluating means evaluates the correspondence is not coordinated, and the abnormality evaluating means determines the particulate filter to be abnormal.

The exhaust emission control device further includes a difference distribution calculation means. The difference distribution calculation means stores a frequency of occurrence for each value of the difference between the first sediment amount and the second sediment amount in a predetermined time period. The difference distribution calculation means calculates an upper representative value and a lower representative value, which are representative of a distribution of the differences in the predetermined time period, in accordance with the frequency of occurrence, which is stored by the difference distribution calculation means. The abnormality evaluating means sets a range of the difference, which is represented by the upper representative value and the lower representative value, as the predetermined reference range.

BRIEF DESCRIPTION OF THE DRAWINGS

The above and other objects, features and advantages of the present invention will become more apparent from the following detailed description made with reference to the accompanying drawings. In the drawings:

FIG. 7 is a flowchart showing a routine for evaluation of a particulate filter, according to a modification of the embodiment of the present invention.

DETAILED DESCRIPTION OF PREFERRED EMBODIMENTS

Embodiment

Figure 1:
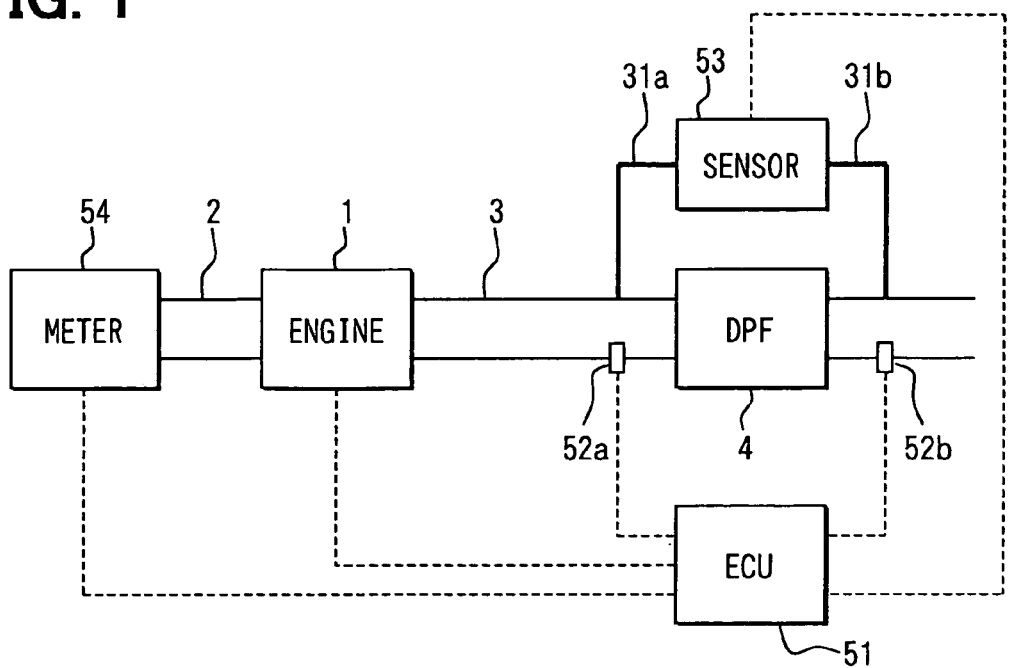
FIG. 1 is a schematic view showing an internal combustion engine provided with an exhaust emission control device according to an embodiment of the present invention.

As shown in FIG. 1, a diesel particulate filter (DPF) 4 is mounted to an exhaust passage 3, which communicates with an exhaust port of an engine body 1. The DPF 4 includes a base body, which is formed by molding a heat resisting ceramics, such as cordierite into a honeycomb construction, for example. The honeycomb construction has a number of cells, which form flow passages of exhaust gas. The cells are sealed such that the inlet sides the outlet sides thereof are made alternate, and coated with an oxidation catalyst such as Pt over the cell wall surfaces. Exhaust gas discharged from the engine body 1 flows downstream while flowing through porous partitions of the DPF 4, and PM is trapped in the meantime to be gradually accumulated.

Exhaust temperature sensors 52a, 52b are provided in the exhaust passage 3 to detect exhaust temperature of exhaust gas.

Differential pressure sensor 53 is provided to detect differential pressure between the front and the rear of the DPF 4 in order to measure an amount of PM, which are trapped by the DPF 4 and accumulated. The differential pressure sensor 53 is interposed between a pressure introduction pipe 31a, which is communicated with the exhaust passage 3 on the upstream side of the DPF 4, and a pressure introduction pipe 31b, which is communicated to the exhaust passage 3 on the downstream side of the DPF 4. The differential pressure sensor 53 outputs a signal corresponding to differential pressure (DPF front and rear differential pressure, DPF differential pressure) between the front and the rear of the DPF 4, i.e., between the upstream and the downstream of the DPF 4. Temperature sensors 52a, 52b are provided immediately upstream and downstream of the DPF 4 to detect temperature of exhaust gas flowing through the DPF 4. Besides, an airflow meter 54 is mounted to an intake passage 2 to detect an amount of intake air.

An ECU (engine control unit, control means) 51 inputs thereinto output signals of the various sensors 51 to 54 and the like to detect states of respective components.

Figure 2:
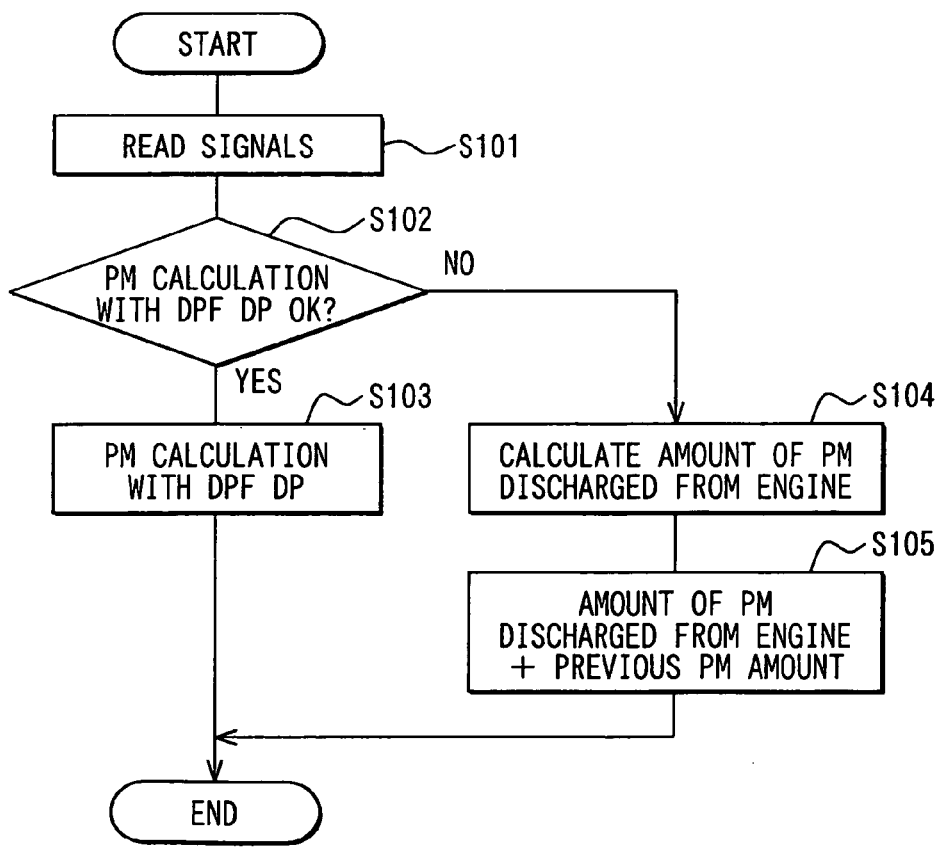
FIG. 2 is a flowchart showing a control routine executed in the exhaust emission control device for calculating a sediment amount of exhaust particulates, according to the embodiment.

FIG. 2 shows a control routine implemented by a microcomputer that constructs the ECU 51. The control routine is implemented at a predetermined control interval by timer interruption in the ECU 51. In STEP S101, various input signals such as DPF differential pressure, exhaust temperature, and an intake amount are read. In STEP S102, which serves as a selection means, it is evaluated whether a PM sediment amount calculation based on DPF differential pressure (PM calculation with DPF dp) is in an authorized state. When an engine operating state is a steady operation, the PM calculation with DPF dp is evaluated to be in the authorized state. The steady operation is evaluated in accordance with engine speed and an accelerator position. When a positive determination is given in STEP S102, the procedure proceeds to STEP S103, and when a negative determination is given in STEP S102, the procedure proceeds to STEP S104.

In STEP S103, which serves as a first sediment amount calculation means (first sediment calculation means) is implemented to calculate a PM sediment amount (PM amount) in accordance with the DPF differential pressure. Here, the first sediment calculation means calculates a first sediment amount in accordance with the DPF differential pressure. The calculation of the PM amount is carried out in accordance with DPF differential pressure, the intake amount, and exhaust temperature. The calculation of the PM amount is carried out by converting an amount of intake air, which is obtained as a mass flow rate, into a volumetric flow rate, for example. The volumetric flow rate is corrected in accordance with exhaust temperature to be a flow rate of exhaust gas flowing through the DPF 4, based on an assumption, in which an intake air is discharged from the engine body 1 as it is. A PM amount is obtained according to a data map in accordance with a flow rate of exhaust gas and DPF differential pressure. Thereafter, the procedure shifts to return.

Following STEPS S104, S105 serve as a second sediment amount calculation means (second sediment calculation means). In STEP S104, the PM amount, which is discharged from the engine, is calculated in accordance with an engine operating state (engine state). Here, the second sediment calculation means calculates a second sediment amount in accordance with the engine state. The PM amount is a discharge amount, which is measured in units of control periods of the present flows. The PM discharge amount is calculated by multiplying the amount of intake air by a predetermined coefficient, for example. The coefficient is in proportion to a PM concentration in exhaust gas. High accuracy is preferably achieved by beforehand obtaining a data map, to which the coefficient corresponds in accordance with an engine state, by conducting experiments or the like. In subsequent STEP S105, the PM discharge amount calculated in STEP S104 is added to the PM amount at the previous time to calculate the PM amount at the present time. After STEP S105 is implemented, the procedure shifts to return. STEP S103 is a calculation method of the PM amount different from the calculation method in STEP S104 and STEP S105. The PM amount at the previous time is needed in calculation in STEP S104 and STEP S105. Therefore, the PM amount obtained in STEP S103 or STEP S105 is stored and updated as the PM amount at the previous time.

According to the above processing, when the engine is in a steady operating state (normal state), the PM amount is calculated in accordance with DPF differential pressure at the present time. When the engine is in an unsteady operating state, the PM amount is obtained by adding an integrated PM discharge amount to the PM amount, which is calculated in accordance with DPF differential pressure at the previous time immediately before the engine state is switched over from the steady operating state to the unsteady operating state. Here, the integrated PM discharge amount is an amount accumulated after the engine becomes in an unsteady operating state.

The calculation of the PM amount in STEP S103 is referred to as the PM calculation with DPF dp. The calculation of the PM amount in STEP S104 and STEP S105 is referred to as a PM calculation with engine state. The PM calculation with DPF dp is fundamentally higher in accuracy than the PM calculation with engine state. The two kinds of calculation methods are switched over to each other. In an unsteady operating state such as the transient state, the PM calculation with engine state is higher in accuracy than the PM calculation with DPF dp. Accuracy of the PM calculation with engine state and accuracy of the PM calculation with DPF dp are beforehand experimentally clarified, so that the criterion, which is for evaluating whether the engine is presently in the steady operating state, is obtained. The engine state, in which PM calculation with DPF dp is higher in accuracy than the PM calculation with engine state, is evaluated to be the steady operating state.

Figure 3:
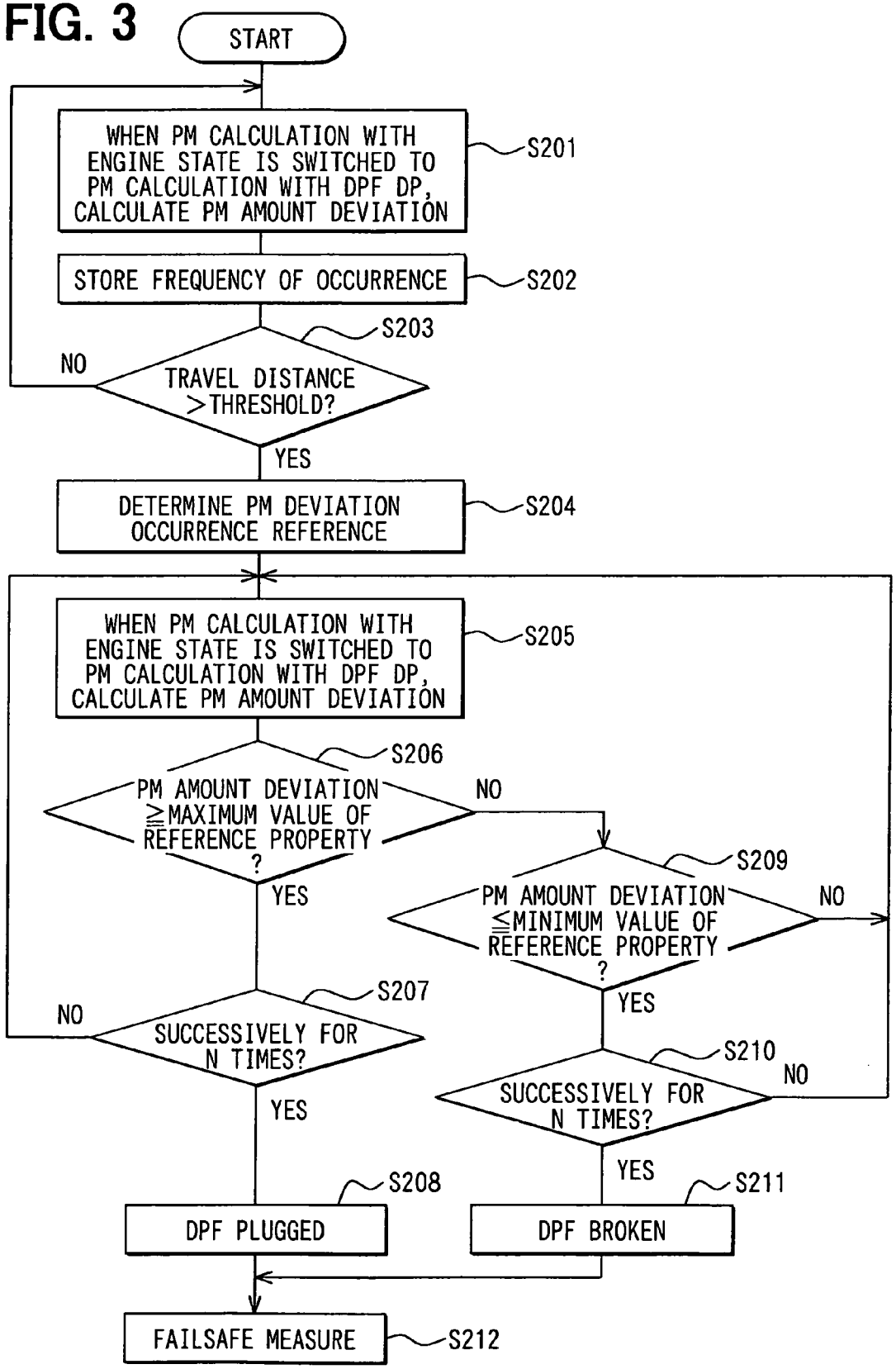
FIG. 3 is a flowchart showing a routine for evaluation of a particulate filter, according to the embodiment.

Subsequently, an evaluation of the DPF 4 and a failsafe control for abnormality of the DPF 4 will be described with reference to FIG. 3. STEPs S201 to S204 serve as a difference distribution calculation means. In STEP S201, switchover, which is from the PM calculation with engine state to the PM calculation with DPF dp, is used as a trigger for calculation of a PM amount deviation. When the switchover is detected, the PM amount deviation is calculated. The switchover, which is from the PM calculation with engine state to the PM calculation with DPF dp, is detected in accordance with results in STEP S102 (positive, negative) in the following manner. When a negative determination is given in STEP S102, that is, when the PM calculation with DPF dp is not determined to be in the authorized state, a predetermined flag is set. By contrast, when a positive determination is given in STEP S102, that is, when the PM calculation with DPF dp is determined to be in the authorized state, it is evaluated whether the flag has been set. When the flag has been set, the PM calculation with engine state has been previously set. That is, when the flag has been set, it is determined that the switchover, which is from the PM calculation with engine state to the PM calculation with DPF dp, has been made.

Next, a calculation of the PM amount deviation is described. The PM amount deviation is a deviation between the PM amount immediately before the switchover, which is from the PM calculation with engine state to the PM calculation with DPF dp, and the PM amount immediately after the switchover. Here, the PM amount deviation corresponds to a value obtained by subtracting the PM calculation with engine state from the PM calculation with DPF dp.

In STEP S202, a frequency of occurrence corresponding to the PM amount deviation is stored in a memory. That is, a region of the memory, in which the frequency of occurrence is stored corresponding to a value of the PM amount deviation, is allotted. Subsequently, the frequency of occurrence of the PM amount deviation at this time is increased by 1.

Figure 4:
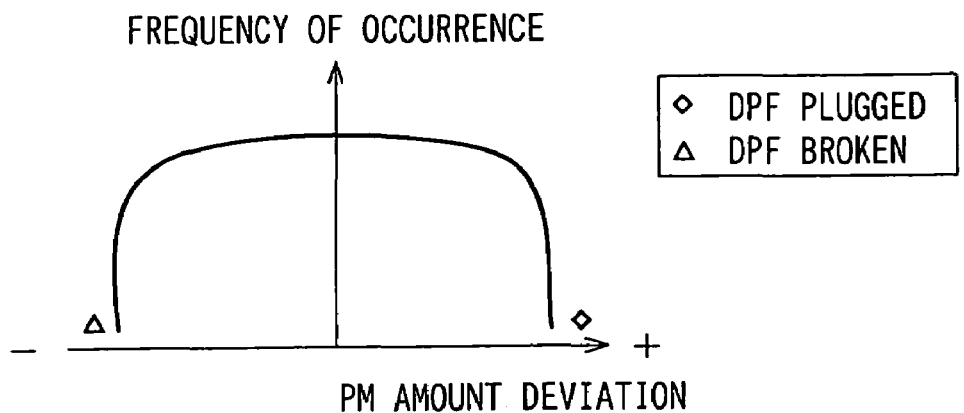
FIG. 4 is a graph showing a relationship between a deviation, which is between sediment amounts of exhaust particulates calculated using different methods, and a frequency of occurrence of the deviation.

Specifically, distribution of the PM amount deviation is shown by the graph in FIG. 4, and when a specific PM amount deviation is frequently obtained, the occurrence of the specific PM amount deviation becomes high, and a distribution of the PM amount deviation is biased around the specific PM amount deviation.

For the purpose of economizing a memory capacity, the values of the PM amount deviation may be divided into several segments. In this case, a region of a memory may be set to be corresponding to each segment of the PM amount deviation in a one-to-one relationship.

In STEP S203, it is evaluated whether a travel distance obtained from a trip meter exceeds a threshold. When a negative determination is given, the processings in STEP S201 and the following STEPs are repeated. Accordingly, until the travel distance reaches the threshold, the PM amount deviation is calculated and the frequency of occurrence is updated. When the travel distance reaches the threshold, a histogram is created. The histogram shows the PM amount deviation in a predetermined time period until the travel distance reaches the threshold. The histogram indicates a distribution of the PM amount deviation as shown in FIG. 4.

When a positive determination is given in STEP S203, that is, when the travel distance reaches the threshold, the histogram is fixed, i.e., is determined as the PM amount deviation occurrence reference property (PM deviation occurrence reference) in STEP S204. The maximum and minimum values of the distribution of the PM amount deviation are calculated as a representative value that prescribes the reference property. Here, the maximum and minimum values, which are respectively upper and lower representative values of the distribution of the PM amount deviation, are represented by an average value and a standard deviation, for example. For example, the maximum value of the distribution of the PM is represented by the average value+2×standard deviation, and the minimum value of the distribution of the PM is represented by the average value−2×standard deviation. Alternatively, the PM amount deviation may be simply compared with the maximum and minimum values in STEP S205, so that the maximum and minimum values may be updated. Subsequently, the maximum and minimum values, which are at the time point when the travel distance reaches the threshold, may be set as the upper and lower representative values of the distribution of the PM amount deviation.

In STEP S205, the switchover, which is from the PM calculation with engine state to the PM calculation with DPF dp, is used as the trigger in the same manner as in STEP S201, and when the switchover is performed, the PM amount deviation is calculated.

In STEP S206, it is evaluated how the PM amount deviation obtained in STEP S205 is positioned relative to the reference property, i.e., the PM deviation occurrence reference shown by the histogram. Besides, it is evaluated in STEP S206 whether the PM amount deviation obtained in STEP S205 is equal to or greater than the maximum value of the reference property. When a negative determination is given, it is evaluated in STEP S209 whether the PM amount deviation is equal to or less than the minimum value of the reference property. When a negative determination is given in STEP S209, that is, when the PM amount deviation is within a reference range that corresponds to a range from the minimum value to the maximum value of the reference property, it is determined that the DPF 4 is not abnormal, and the processings in STEP S205 and the following STEPs are repeated.

When a positive determination is given in STEP S206, that is, the PM amount deviation is determined to be equal to or greater than the maximum value of the reference property, the routine proceeds to STEP S207. It is evaluated in STEP S207 whether the PM amount deviation becomes equal to or greater than the maximum value of the reference property successively for n times. That is, when a positive determination is given in STEP S206, a variable is incremented 1 by 1. This variable counts the number of the conditions, in which the PM amount deviation becomes equal to or greater than the maximum value of the reference property. When a negative determination is given in STEP S206, the variable is reset.

When a negative determination is given in STEP S207, that is, the PM amount deviation is not determined to be equal to or greater than the maximum value of the reference property successively for n times, the processings in STEP S205 and the following STEPs are repeated.

When a positive determination is given in STEP S207, it is evaluated in STEP S208 that the DPF is plugged. Subsequent to STEP S208, a failsafe measure such as lighting of an alarm lamp is taken in STEP S212.

By contrast, when a positive determination is given in STEP S209, that is, the PM amount deviation is determined to be equal to or less than the minimum value of the reference property, the routine proceeds to STEP S210. It is evaluated in STEP S210 whether the PM amount deviation becomes equal to or less than the minimum value of the reference property successively for n times.

That is, when a positive determination is given in STEP S209, a variable is incremented 1 by 1. This variable counts the number of the conditions, in which the PM amount deviation becomes equal to or less than the minimum value of the reference property. The variable is reset when a positive determination is given in STEP S206, or when a negative determination is given in STEP S209. When a negative determination is given in STEP S210, the processings in STEP S205 and the following STEPs are repeated.

When a positive determination is given in STEP S210, the routine proceeds to STEP S211, in which it is determined that the DPF is broken. Subsequently, the procedure proceeds to STEP S212, in which a failsafe measure is taken.

Figure 5A:
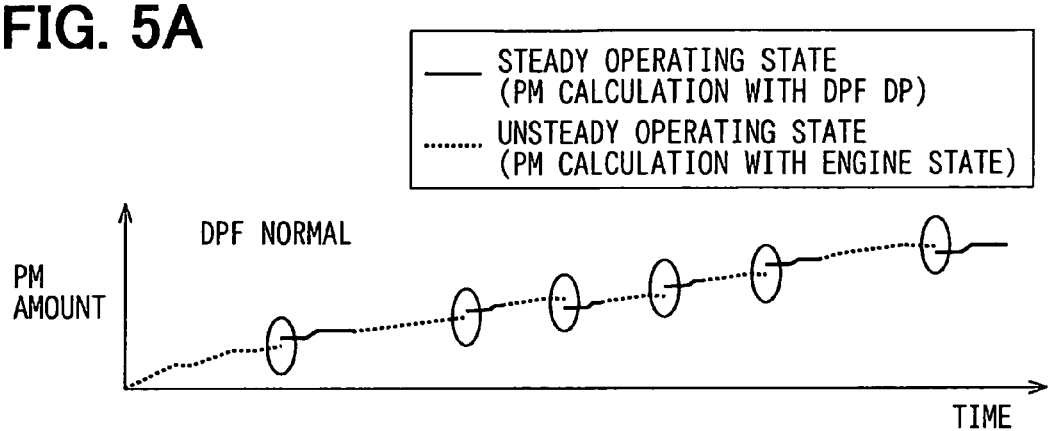
FIG. 5A is a first graph showing changes in a calculated value of the sediment amount of exhaust particulates as time elapses in a normal condition.
Figure 5B:
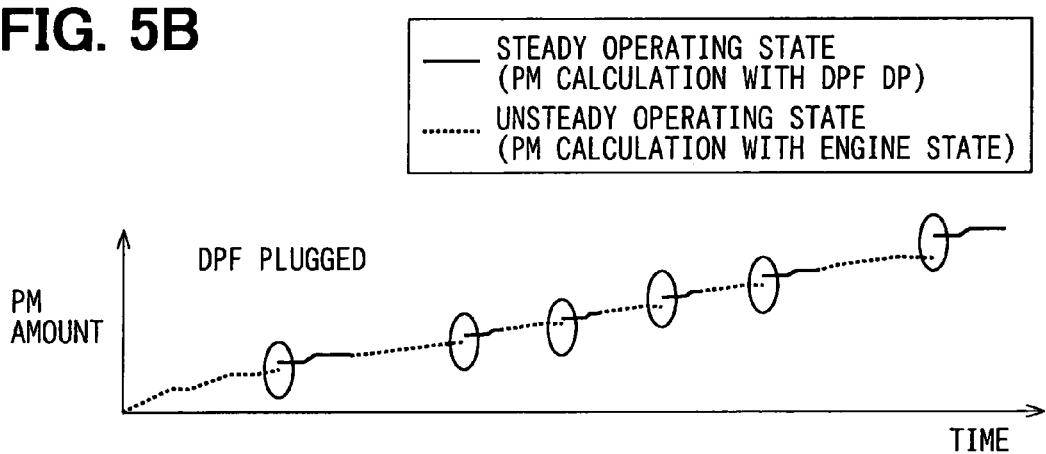
FIG. 5B is a second graph showing changes in a calculated value of the sediment amount of exhaust particulates as time elapses when the particulate filter is plugged.
Figure 5C:
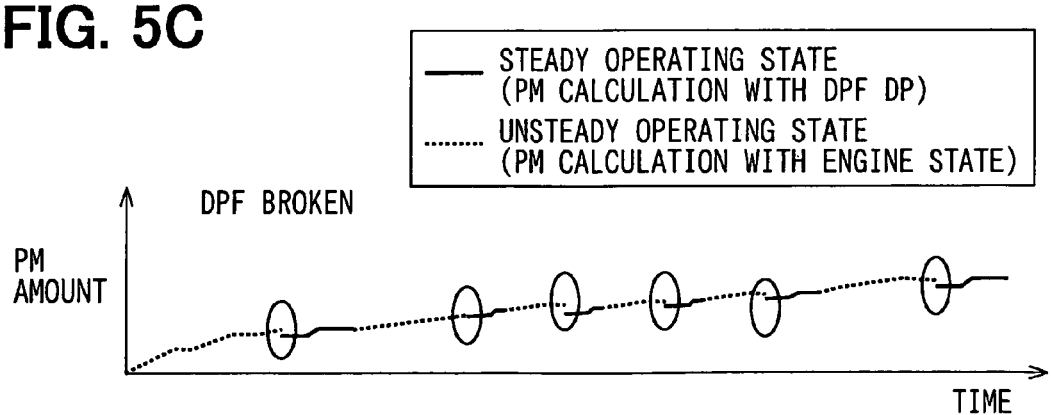
FIG. 5C is a third graph showing changes in a calculated value of the sediment amount of exhaust particulates as time elapses when the particulate filter is broken.

In the exhaust emission control device, abnormality of the DPF 4 is detected. In FIGS. 5A, 5B, 5C, the unsteady operating state changes to the steady operating state in the portions shown by circles. That is, the PM calculation with engine state is switched to the PM calculation with DPF dp in the portions shown by the circles.

An actual value of the PM amount is considered to be substantially the same immediately before and immediately after the switchover, which is from the PM calculation with engine state to the PM calculation with DPF dp. Therefore, when the DPF 4 is neither plugged nor broken, the PM amount calculated using the PM calculation with DPF dp is not largely different from the PM amount calculated using the PM calculation with engine state. Therefore, the PM amount deviation, which is the difference between the PM amount calculated using the PM calculation with engine state and the PM amount calculated using the PM calculation with DPF dp, is distributed centering substantially on 0.

That is, the PM amount, which is calculated using the PM calculation with DPF dp, is affected by plugging or breakage of the DPF 4. However, the PM amount, which is calculated using the PM calculation with engine state, is not affected by plugging, breakage of the DPF 4 or the like. Accordingly, presence and absence of abnormality in the DPF 4 such as plugging and breakage can be evaluated based on a correspondence between the PM amounts, which are calculated using the PM calculation with DPF dp and the PM calculation with engine state. Besides, the PM amount, which is calculated through integration of a discharge amount of exhaust particulates and is compared with the PM amount calculated using the PM calculation with DPF dp, substantially corresponds to the PM amount at this time point. That is, the PM amount, which is calculated using the PM calculation with engine state, substantially corresponds to the actual PM amount even when immediately after completing regeneration of the DPF 4, in which the PM amount is small, or even when the DPF 4 is still plugged or broken. Therefore, presence and absence of abnormality in the DPF 4 is not hard to be evaluated even in a time period shortly after completing regeneration, in which the PM amount is small.

Figure 6:
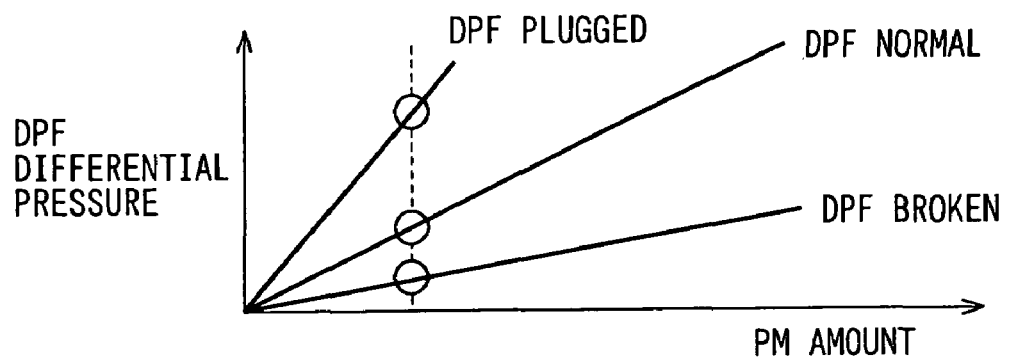
FIG. 6 is a graph showing a relationship between the sediment amount of exhaust particulates and differential pressure between the front and the rear of the particulate filter.

In contrast, when the DPF 4 is plugged or broken, it results as follows. As shown in FIG. 6, when the DPF 4 is plugged, flow resistance increases in the DPF 4, and differential pressure of the DPF 4 increases as compared with differential pressure of the DPF 4 in the normal condition. Therefore, as referred to FIG. 4, a center of the distribution of the PM amount deviation shifts to the + side. Besides, the probability that the PM amount deviation becomes equal to or greater than the maximum value of the reference property, i.e., the PM deviation occurrence reference shown by the histogram becomes high.

By contrast, as referred to FIG. 4, when the DPF 4 is broken, differential pressure of the DPF 4 decreases as compared with the differential pressure of the DPF 4 in the normal condition, due to leakage of exhaust gas from a broken portion of the DPF 4. Therefore, a center of the distribution of the PM amount deviation shifts to the − side. Accordingly, the probability that the PM amount deviation becomes equal to or less than the minimum value of the reference property becomes high.

Accordingly, an abnormality in the DPF 4 can be correctly evaluated using the above control routine.

Besides, an actual value of the PM amount is substantially the same immediately before and immediately after the switchover, which is from the PM calculation with engine state to the PM calculation with DPF dp. In this situation, the difference, which is between the PM calculation with engine state and the PM calculation with DPF dp, is calculated to evaluate abnormality in the DPF 4. Thereby, abnormality in the DPF 4 need not to be evaluated in both the methods at all times to obtain the PM amount, so that an excessive load can be eliminated in calculation.

Here, for the purpose of evaluation of abnormality in the DPF 4, the PM amount may be calculated in both the methods at all times, and presence and absence of abnormality in the DPF 4 may be evaluated each time.

Besides, the integrated value of the PM discharge amount is added to the PM amount, which is calculated using the PM calculation with DPF dp at the previous time, so that the PM amount in the unsteady operating state is calculated. Thereby, an error, which involves a relatively large error, caused in the PM calculation with engine state is not cumulated over a long period.

The PM amount, which is integrated using the PM calculation with engine, is relatively large in error relative to the actual PM amount. Here, a time period, in which the PM amount is integrated using the PM calculation with engine is limited to a period of time, in which the PM amount is not calculated using the PM calculation with DPF dp. Thereby, a load in calculation does not become excessive in spite of using two kinds of the PM amount calculation means. Furthermore, accumulation of errors in the PM calculation with engine, which is relatively large in error, can be restricted over a long term.

In addition, the reference property, which is for evaluation of presence and absence of abnormality in the DPF 4, is learned in the operation of the engine. Thereby, changes, which are due to aging, and individual variations can be absorbed. Here, simply, such changes and individual differences may be beforehand stored as fixed values.

(Modification)

As described above, the number of times, in which the positive determinations are successively given in STEP S206, is counted, in order to enhance the accuracy in evaluation. Besides, the number of times, in which the negative determinations are successively given in STEP S206 and the positive determinations are given in STEP S209, is counted. Thereby, whether occurrence is successive for n times is evaluated in STEPs S207, S210. However, the accuracy in evaluation can be enhanced in another way.

As shown in FIG. 7, it is evaluated in STEP S2071 whether the frequency of occurrence, in which the PM amount deviation is equal to or greater than the maximum value of the reference property, is equal to or greater than a predetermined value m %. Besides, it is evaluated in STEP S2101 whether the frequency of occurrence, in which the PM amount deviation is equal to or less than the minimum value of the reference property, is equal to or greater than a predetermined value m %. The frequency of occurrences is represented in a rate to the number of times, in which the switchover, which is from PM calculation with engine state to PM calculation with DPF dp, is made.

Therefore, the frequency of occurrence is calculated by counting the number of times, in which positive determinations are given in STEP S206, together with counting the number of times, in which the switchover, which is from PM calculation with engine state to PM calculation with DPF dp, is made. Besides, the frequency of occurrence is calculated by counting the number of times, in which negative determinations are given in STEP S206 and positive determinations are given in STEP S209, together with counting the number of times, in which the switchover is made.

Thus, as described above, the reference range for evaluation of presence and absence of abnormality in the DPF 4 is learned while the engine is operated, so that an erroneous evaluation of presence and absence of the abnormality in the particulate filter may be restricted.

Various modifications and alternations may be diversely made to the above embodiments without departing from the spirit of the present invention.

What is claimed is:

1. An exhaust emission control device for an internal combustion engine, the exhaust emission control device comprising:
   a particulate filter that traps exhaust particulates contained in exhaust gas discharged from an internal combustion engine body; and
   a sediment amount calculation means that calculates a sediment amount of exhaust particulates, which are trapped and accumulated by the particulate filter, for evaluating necessity of regeneration of the particulate filter in accordance with the sediment amount,
   wherein the sediment amount calculation means includes a first sediment calculation means and a second sediment amount calculation means,
   the first sediment calculation means calculates a first sediment amount in accordance with differential pressure between a front side of the particulate filter and a rear side of the particulate filter, and
   the second sediment amount calculation means calculates an amount of exhaust particulates discharged from the internal combustion engine body per unit of time in accordance with an operating state of the internal combustion engine body, the second sediment amount calculation means integrating the amount of exhaust particulates to calculate a second sediment amount,
   the exhaust emission control device further comprising:
   an abnormality evaluating means that evaluates presence and absence of an abnormality in flow of exhaust gas, which flows through the particulate filter, in accordance with a correspondence between the first sediment amount and the second sediment amount;
   a selection means that selects from the first sediment calculation means and the second sediment calculation means in accordance with the operating state of the internal combustion engine body for evaluating necessity of regeneration of the particulate filter,
   wherein the second sediment amount calculation means calculates the second sediment amount by integrating the amount of exhaust particulates, which are discharged from the internal combustion engine body, with the first sediment amount, which is calculated immediately before the sediment amount calculation means is switched from the first sediment calculation means,
   the abnormality evaluating means expresses the correspondence between the first sediment amount and the second sediment amount using a difference between the sediment amount calculated immediately before switchover, which is from the second sediment amount calculation means to the first sediment calculation means, and the sediment amount calculated immediately after the switchover from the second sediment amount calculation means to the first sediment calculation means, and
   when the difference between the first sediment amount and the second sediment amount is out of a predetermined reference range, the abnormality evaluating means determines the correspondence is not coordinated, and the abnormality evaluating means determines the particulate filter to be abnormal.

2. The exhaust emission control device according to claim 1, further comprising:
   a difference distribution calculation means that stores a frequency of occurrence for each value of the difference between the first sediment amount and the second sediment amount in a predetermined time period, wherein the difference distribution calculation means calculates an upper representative value and a lower representative value, which are representative of a distribution of the differences in the predetermined time period, in accordance with the frequency of occurrence, which is stored by the difference distribution calculation means, and the abnormality evaluating means sets a range of the difference, which is represented by the upper representative value and the lower representative value, as the predetermined reference range.

3. The exhaust emission control device according to claim 1, wherein the operating state of the internal combustion engine body includes engine speed and an accelerator position.

4. The exhaust emission control device according to claim 1, wherein the abnormality is breakage in the particulate filter.

5. The exhaust emission control device according to claim 1, wherein the abnormality is plugging in the particulate filter.

6. A method of controlling exhaust emission for an internal combustion engine, the method comprising:

trapping, in a particulate filter, exhaust particulates contained in exhaust gas discharged from an internal combustion engine body; and calculating a sediment amount of exhaust particulates, which are trapped and accumulated by the particulate filter, and evaluating necessity of regeneration of the particulate filter in accordance with the sediment amount, said calculating comprising:

calculating a first sediment amount in accordance with differential pressure between a front side of the particulate filter and a rear side of the particulate filter; and calculating an amount of exhaust particulates discharged from the internal combustion engine body per unit of time in accordance with an operating state of the internal combustion engine body, and integrating the amount of exhaust particulates to calculate a second sediment amount; and evaluating a presence or absence of an abnormality in flow of exhaust gas, which flows through the particulate filter, in accordance with a correspondence between the first sediment amount and the second sediment amount;

wherein said evaluating a presence or absence of an abnormality in flow of the exhaust gas in accordance with a correspondence between the first sediment amount and the second sediment amount includes:

calculating a difference between the first sediment amount and the second sediment amount; and determining the particulate filter to be abnormal if the difference between the first sediment amount and the second sediment amount is out of a predetermined reference range.

7. The method according to claim 6, further comprising:

storing a frequency of occurrence for each value of the difference between the first sediment amount and the second sediment amount in a predetermined time period;

calculating an upper representative value and a lower representative value, which are representative of a distribution of the differences in the predetermined time period, in accordance with the stored frequency of occurrence; and setting a range of the difference, which is represented by the upper representative value and the lower representative value, as the predetermined reference range.

* * * * *